(12) United States Patent
Beacham

(10) Patent No.: US 12,480,419 B1
(45) Date of Patent: Nov. 25, 2025

(54) OUTER AIR SEAL (OAS) ASSEMBLY FOR A GAS TURBINE ENGINE

(71) Applicant: RTX Corporation, Farmington, CT (US)

(72) Inventor: Sean T. Beacham, Bridgton, ME (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/949,550

(22) Filed: Nov. 15, 2024

(51) Int. Cl.
    *F01D 11/12* (2006.01)

(52) U.S. Cl.
    CPC .................. *F01D 11/122* (2013.01)

(58) Field of Classification Search
    CPC ........ F01D 11/08; F01D 11/12; F01D 11/122; F01D 11/16; F05D 2240/11; F05D 2240/55; F05D 2260/38
    See application file for complete search history.

(56) References Cited

U.S. PATENT DOCUMENTS

| | | | | |
|---|---|---|---|---|
| 3,730,640 A | * | 5/1973 | Rice | F01D 11/08 415/117 |
| 3,966,356 A | * | 6/1976 | Irwin | F01D 11/08 415/113 |
| 8,475,118 B2 | * | 7/2013 | Mulcaire | F01D 11/24 415/173.2 |
| 9,200,530 B2 | * | 12/2015 | McCaffrey | F01D 11/16 |
| 9,845,702 B2 | * | 12/2017 | Leslie | F04D 29/522 |
| 10,107,129 B2 | * | 10/2018 | McCaffrey | F01D 25/246 |
| 11,808,157 B1 | | 11/2023 | K P | |
| 12,055,046 B2 | | 8/2024 | Sharma | |
| 12,140,035 B2 | * | 11/2024 | Vitt | F01D 11/16 |
| 2017/0067366 A1 | * | 3/2017 | Stricker | F01D 25/246 |

* cited by examiner

*Primary Examiner* — Brian P Wolcott
(74) *Attorney, Agent, or Firm* — Getz Balich LLC

(57) ABSTRACT

A gas turbine engine includes a bladed rotor, a case, and an outer air seal (OAS) assembly. The bladed rotor includes a plurality of rotor blades each extending to a blade tip. The case circumscribes the bladed rotor. The case forms an OAS cavity at the rotor stage. The OAS assembly includes a plurality of OAS segments and an air seal. The plurality of OAS segments are disposed within the OAS cavity. Each of the OAS segments is radially moveable within the OAS cavity between and to an inboard radial position and an outboard radial position. The air seal is positioned radially between and contacting the case and the seal body. The air seal biases each of the plurality of OAS segments towards the inboard radial position.

17 Claims, 5 Drawing Sheets

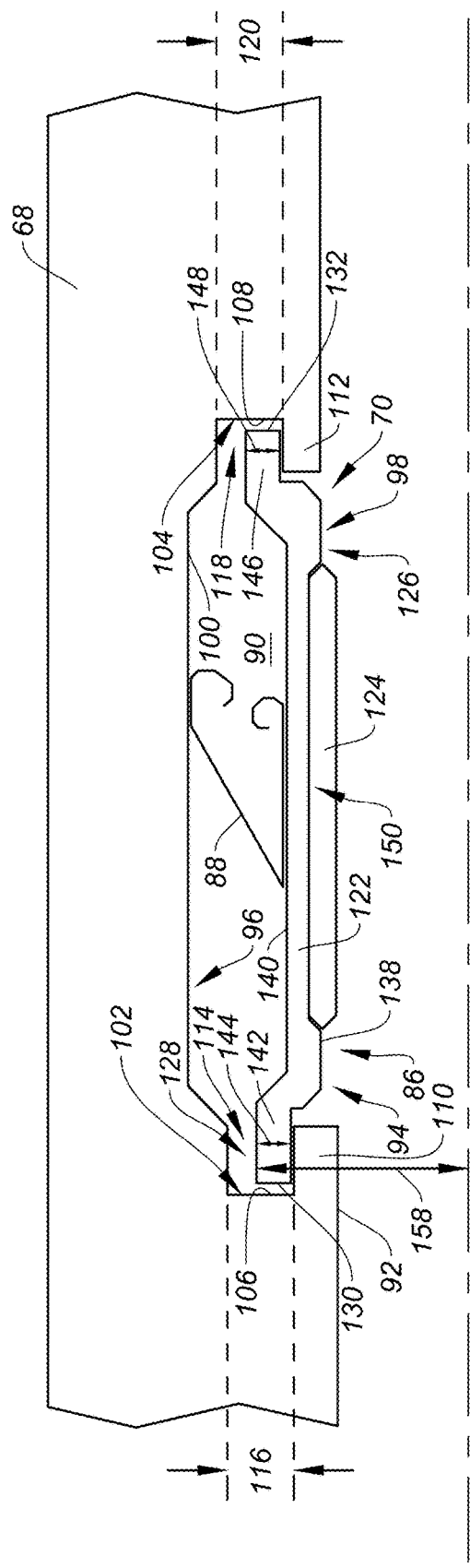

OUTER AIR SEAL (OAS) ASSEMBLY FOR A GAS TURBINE ENGINE

BACKGROUND

1. Technical Field

This disclosure relates generally to gas turbine engines for aircraft propulsion systems and, more particularly, to outer air seal (OAS) assemblies for a compressor section of a gas turbine engine.

2. Background Information

Gas turbine engines for aircraft propulsion systems may typically include a compressor section including at least one bladed rotor configured to compress air for subsequent use in a combustion process. This bladed rotor may be surrounded by a compressor case forming an outer boundary of an air flow path through the compressor section. The compressor section may additionally include outer air seal (OAS) assemblies mounted on the compressor case in close proximity to blades of the bladed rotor. Various OAS assembly configurations are known in the art. While these known OAS assembly configurations may be suitable for their intended purposes, there is always room in the art for improvement.

SUMMARY

According to an aspect of the present disclosure, a gas turbine engine includes a bladed rotor, a case, and an outer air seal (OAS) assembly. The bladed rotor is configured for rotation about a rotational axis. The bladed rotor includes a rotor stage. The rotor stage includes a plurality of rotor blades circumferentially arranged about the rotational axis. Each of the plurality of rotor blades extends radially outward to a blade tip. The case extends circumferentially about the rotational axis and circumscribes the bladed rotor. The case forms an OAS cavity at the rotor stage. The OAS cavity includes a leading axial end slot and a trailing axial end slot. The OAS assembly includes a plurality of OAS segments and an air seal. The plurality of OAS segments are disposed within the OAS cavity. The plurality of OAS segments are arranged circumferentially to form the OAS assembly extending circumferentially about the rotational axis. Each of the plurality of OAS segments includes a seal body extending between and to a first circumferential body end and a second circumferential body end. The seal body includes a leading end body hook and a trailing end body hook. The leading end body hook is disposed in the leading axial end slot. The trailing end body hook is disposed in the trailing axial end slot. Each of the OAS segments is radially moveable within the OAS cavity between and to an inboard radial position and an outboard radial position. The air seal is positioned radially between and contacting the case and the seal body. The air seal biases each of the plurality of OAS segments towards the inboard radial position.

In any of the aspects or embodiments described above and herein, the seal body may include an inner radial face, and each of the plurality of OAS segments may further include an abradable seal disposed at the inner radial face.

In any of the aspects or embodiments described above and herein, the air seal may be a finger seal.

In any of the aspects or embodiments described above and herein, the leading axial end slot may have a radial span, the leading end body hook may have a radial thickness, and the radial span may be greater than the radial thickness.

In any of the aspects or embodiments described above and herein, the radial span may be greater than the radial thickness by at least 0.1 percent of a radius of the seal body.

In any of the aspects or embodiments described above and herein, the case may include a cavity end wall, a leading end case hook, and a trailing end case hook, the case may form the leading axial end slot radially between the leading end case hook and the cavity end wall, and the case may form the trailing axial end slot radially between the trailing end case hook and the cavity end wall.

In any of the aspects or embodiments described above and herein, the first circumferential body end of the seal body of a first OAS segment of the plurality of OAS segments may be disposed circumferentially adjacent the second circumferential body end of the seal body of a second OAS segment of the plurality of OAS segments at a segment interface, the first OAS segment and the second OAS segment in the inboard radial position may form a circumferential gap at the segment interface, and the first OAS segment and the second OAS segment in the outboard radial position may circumferentially abut one another at the segment interface.

In any of the aspects or embodiments described above and herein, the first OAS segment and the second OAS segment may form a shiplap joint at the segment interface.

In any of the aspects or embodiments described above and herein, the seal body may extend radially between and to an inner radial face and an outer radial face, the air seal may contact the seal body on the outer radial face, the outer radial face may be disposed axially between the leading end body hook and the trailing end body hook, and the leading end body hook and the trailing end body hook may be disposed radially outward of the outer radial face.

In any of the aspects or embodiments described above and herein, the leading end body hook and the trailing end body hook may radially abut the case in the inboard radial position and the outboard radial position.

According to another aspect of the present disclosure, a gas turbine engine includes a bladed rotor, a case, and an outer air seal (OAS) assembly. The bladed rotor is configured for rotation about a rotational axis. The bladed rotor includes a rotor stage. The rotor stage includes a plurality of rotor blades circumferentially arranged about the rotational axis. Each of the plurality of rotor blades extends radially outward to a blade tip. The case extends circumferentially about the rotational axis and circumscribes the bladed rotor. The case forms an OAS cavity at the rotor stage. The case includes a cavity end wall, a leading end case hook, and a trailing end case hook. The case forms a leading axial end slot radially between the leading end case hook and the cavity end wall. The case forms a trailing axial end slot radially between the trailing end case hook and the cavity end wall. The OAS assembly includes a plurality of OAS segments and an air seal. The plurality of OAS segments is disposed within the OAS cavity. The plurality of OAS segments are arranged circumferentially to form the OAS assembly extending circumferentially about the rotational axis. Each of the plurality of OAS segments includes a seal body extending between and to a first circumferential body end and a second circumferential body end. The seal body extends between and to a leading axial body end and a trailing axial body end. The seal body includes a leading end body hook at the leading axial body end. The seal body includes a trailing end body hook at the trailing axial body end. The leading end body hook is disposed in the leading axial end slot. The trailing end body hook is disposed in the trailing axial end slot. The air seal is positioned radially between and contacting the cavity end wall and the seal body. The air seal biases the leading end body hook toward the leading end case hook and biases the trailing end body hook toward the trailing end case hook.

In any of the aspects or embodiments described above and herein, the seal body may include an inner radial face, and each of the plurality of OAS segments may further include an abradable seal disposed at the inner radial face.

In any of the aspects or embodiments described above and herein, the air seal may be a finger seal.

In any of the aspects or embodiments described above and herein, the leading axial end slot may have a radial span, the leading end body hook may have a radial thickness, and the radial span may be greater than the radial thickness.

In any of the aspects or embodiments described above and herein, the leading end body hook and the trailing end body hook may radially abut the case in the inboard radial position and the outboard radial position.

According to another aspect of the present disclosure, a gas turbine engine includes a bladed rotor, a case, and an outer air seal (OAS) assembly. The bladed rotor is configured for rotation about a rotational axis. The bladed rotor includes a rotor stage. The rotor stage includes a plurality of rotor blades circumferentially arranged about the rotational axis. Each of the plurality of rotor blades extends radially outward to a blade tip. The case extends circumferentially about the rotational axis and circumscribes the bladed rotor. The case forms an OAS cavity at the rotor stage. The OAS cavity includes a leading axial end slot and a trailing axial end slot. Each of the leading axial end slot and the trailing axial end slot having a radial span. The OAS assembly includes a plurality of OAS segments and an air seal. The plurality of OAS segments are disposed within the OAS cavity. The plurality of OAS segments are arranged circumferentially to form the OAS assembly extending circumferentially about the rotational axis. Each of the plurality of OAS segments includes a seal body extending between and to a first circumferential body end and a second circumferential body end. The seal body extends between and to a leading axial body end and a trailing axial body end. The leading axial body end is disposed in the leading axial end slot. The trailing axial body end is disposed in the trailing axial end slot. Each of the leading axial body end and the trailing axial body end has a radial thickness. The radial span is greater than the radial thickness by at least 0.1 percent of a radius of the seal body. Each of the OAS segments is radially moveable within the OAS cavity between and to an inboard radial position and an outboard radial position. The air seal is positioned radially between and contacting the case and the seal body. The air seal biases each of the plurality of OAS segments towards the inboard radial position.

In any of the aspects or embodiments described above and herein, the seal body may include an inner radial face, and each of the plurality of OAS segments may further include an abradable seal disposed at the inner radial face.

In any of the aspects or embodiments described above and herein, the air seal may be a finger seal.

In any of the aspects or embodiments described above and herein, the first circumferential body end of the seal body of a first OAS segment of the plurality of OAS segments may be disposed circumferentially adjacent the second circumferential body end of the seal body of a second OAS segment of the plurality of OAS segments at a segment interface, the first OAS segment and the second OAS segment in the inboard radial position may form a circumferential gap at the segment interface, and the first OAS segment and the second OAS segment in the outboard radial position may circumferentially abut one another at the segment interface.

In any of the aspects or embodiments described above and herein, the seal body may extend radially between and to an inner radial face and an outer radial face, the air seal may contact the seal body on the outer radial face, and the outer radial face may be radially inward of the seal body at the leading axial body end and the trailing axial body end.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

FIG. 4 schematically illustrates a cutaway, side view of an outer air seal (OAS) assembly of the compressor section in a first radial position, in accordance with one or more embodiments of the present disclosure.

FIG. 5 schematically illustrates another cutaway, side view of the OAS assembly of FIG. 4 in a second radial position, in accordance with one or more embodiments of the present disclosure.

DETAILED DESCRIPTION

Figure 1:
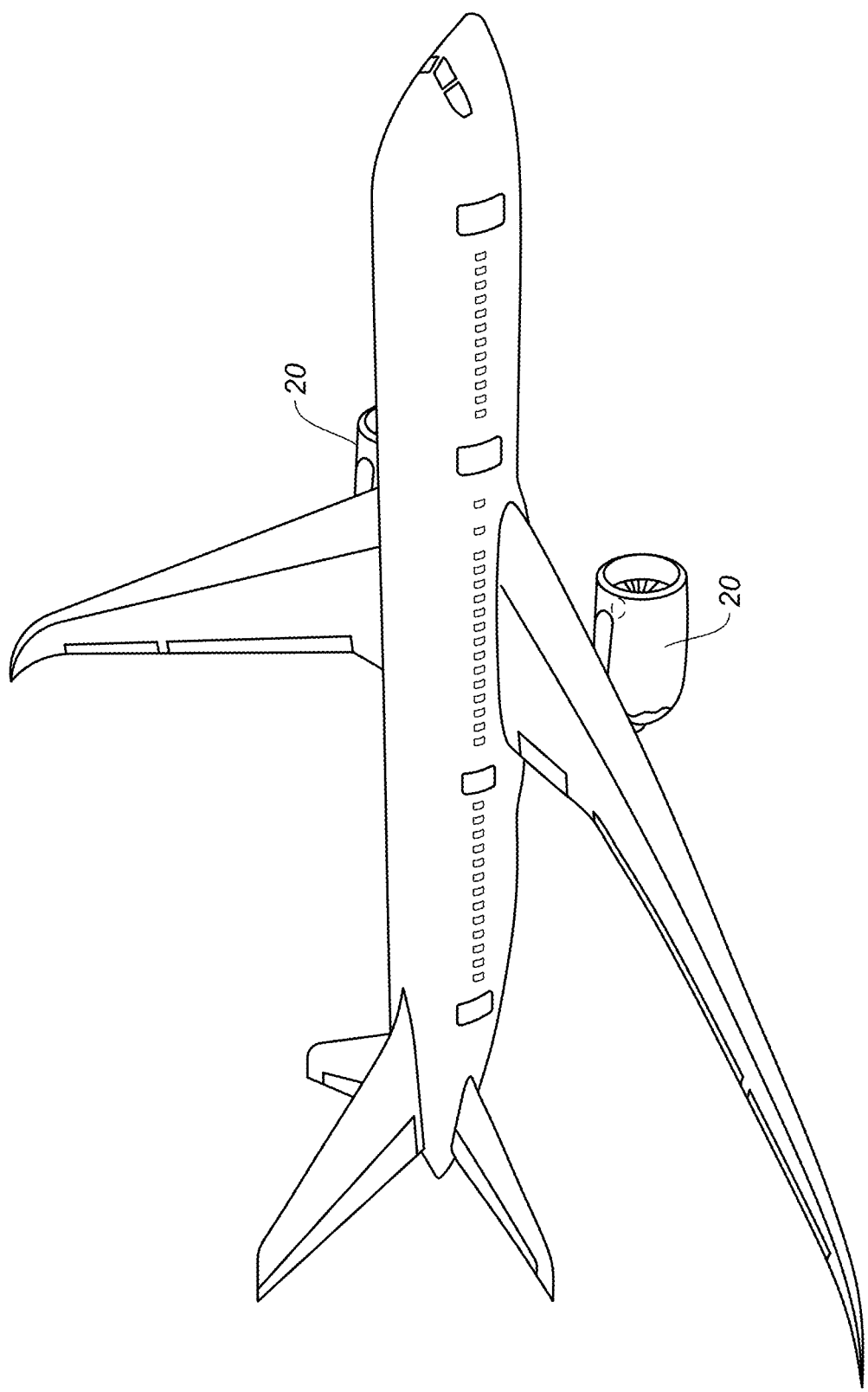
FIG. 1 illustrates propulsion systems for an aircraft, in accordance with one or more embodiments of the present disclosure.

FIG. 1 illustrates a propulsion system 20 for an aircraft. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone).

Figure 2:
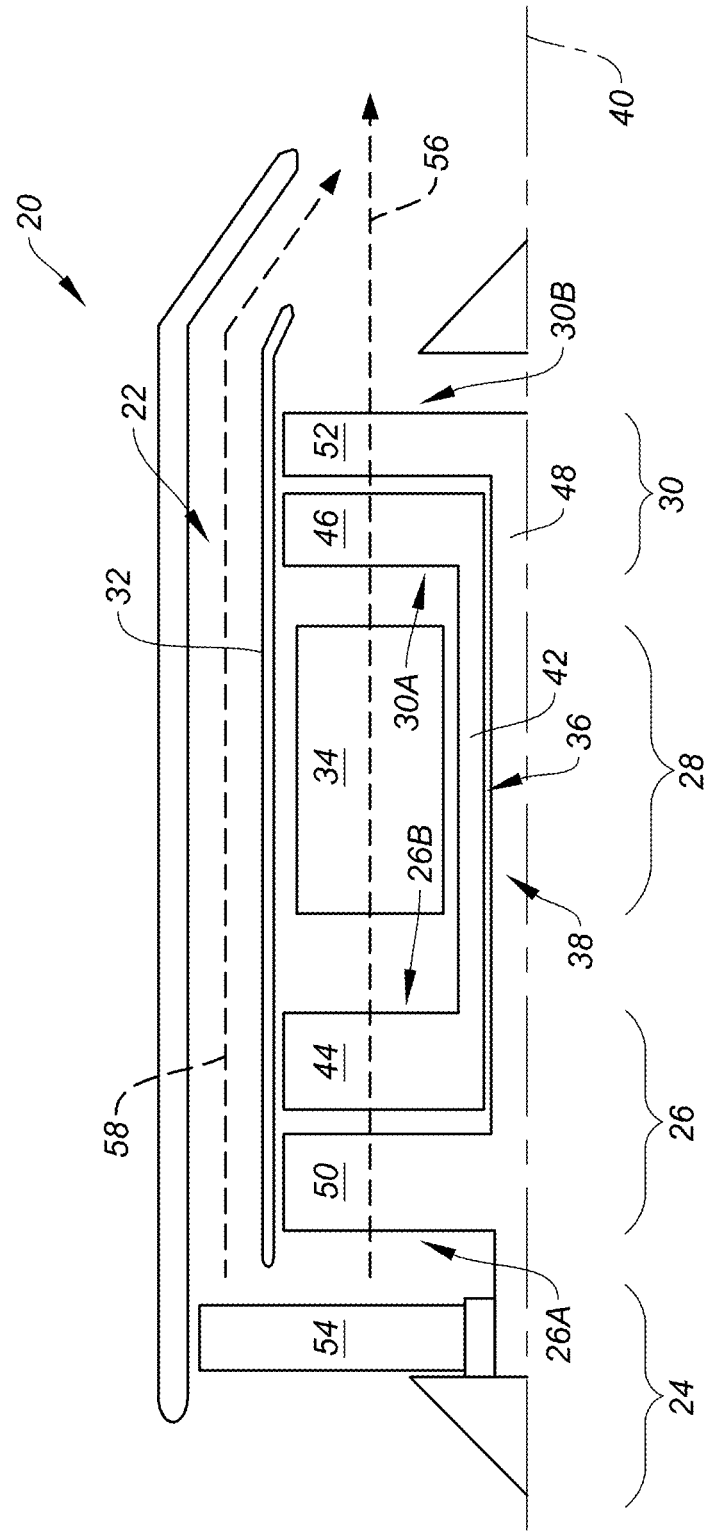
FIG. 2 schematically illustrates cutaway, side view of an aircraft propulsion system including a gas turbine engine, in accordance with one or more embodiments of the present disclosure.

FIG. 2 schematically illustrates a cutaway, side view of the propulsion system 20. The propulsion system 20 includes a gas turbine engine 22. The gas turbine engine 22 of FIG. 2 is configured as a multi-spool turbofan gas turbine engine. However, while the following description and accompanying drawings may refer to the turbofan gas turbine engine of FIG. 2 as an example, it should be understood that aspects of the present disclosure may be equally applicable to other types of gas turbine engines including, but not limited to, a turboshaft gas turbine engine, a turboprop gas turbine engine, a turbojet gas turbine engine, a propfan gas turbine engine, or an open rotor gas turbine engine.

The gas turbine engine 22 of FIG. 2 includes a fan section 24, a compressor section 26, a combustor section 28, a turbine section 30, and an engine static structure 32. The compressor section 26 includes a low-pressure compressor (LPC) 26A and a high-pressure compressor (HPC) 26B. The combustor section 28 includes a combustor 34 (e.g., an annular combustor). The turbine section 30 includes a high-pressure turbine (HPT) 30A and a low-pressure turbine (LPT) 32B.

Components of the fan section 24, the compressor section 26, and the turbine section 30 form a first rotational assembly 36 (e.g., a high-pressure spool) and a second rotational assembly 38 (e.g., a low-pressure spool) of the gas turbine engine 22. The first rotational assembly 36 and the second rotational assembly 38 are mounted for rotation about a rotational axis 40 (e.g., an axial centerline) of the gas turbine engine 22 relative to the engine static structure 32.

The first rotational assembly 36 includes a first shaft 42, a bladed first compressor rotor 44 for the high-pressure compressor 26B, and a bladed first turbine rotor 46 for the high-pressure turbine 30A. The first shaft 42 interconnects the bladed first compressor rotor 44 and the bladed first turbine rotor 46.

The second rotational assembly 38 includes a second shaft 48, a bladed second compressor rotor 50 for the low-pressure compressor 26A, a bladed second turbine rotor 52 for the low-pressure turbine 30B, and a bladed fan rotor 54 for the fan section 24. The second shaft 48 of FIG. 2 interconnects the bladed second compressor rotor 50, the bladed second turbine rotor 52, and the bladed fan rotor 54. The bladed fan rotor 54 may alternatively be connected to the second shaft 48 by a gear train (e.g., a reduction gear assembly) configured to drive rotation of the bladed fan rotor 54 at a different rotational speed than the second shaft 48. The first shaft 42 and the second shaft 48 are concentric and configured to rotate about the rotational axis 40. The present disclosure, however, is not limited to concentric configurations of the first shaft 42 and the second shaft 48.

The engine static structure 32 may include one or more engine cases, cowlings, bearing assemblies, and/or other non-rotating structures configured to house and/or support (e.g., rotationally support) components of the gas turbine engine 22 sections 24, 26, 28, 30.

In operation of the gas turbine engine 22 of FIG. 2, ambient air is directed through the fan section 24 and into a core flow path 56 (e.g., an annular flow path) and a bypass flow path 58 (e.g., an annular flow path) facilitated by rotation of the bladed fan rotor 54. Airflow along the core flow path 56 is compressed by the low-pressure compressor 26A and the high-pressure compressor 26B, mixed and burned with fuel in the combustor 34, and then directed through the high-pressure turbine 30A and the low-pressure turbine 30B. The bladed first turbine rotor 46 and the bladed second turbine rotor 52 rotationally drive the first rotational assembly 36 and the second rotational assembly 38, respectively, in response to the combustion gas flow through the high-pressure turbine 30A and the low-pressure turbine 30B. The bypass flow path 58 may be disposed outside the engine static structure 32. For example, the engine static structure 32 and an outer aircraft propulsion system housing (e.g., a nacelle) may form an annular bypass duct radially therebetween, and airflow may be directed through the annular bypass duct along the bypass flow path 58.

Figure 3:
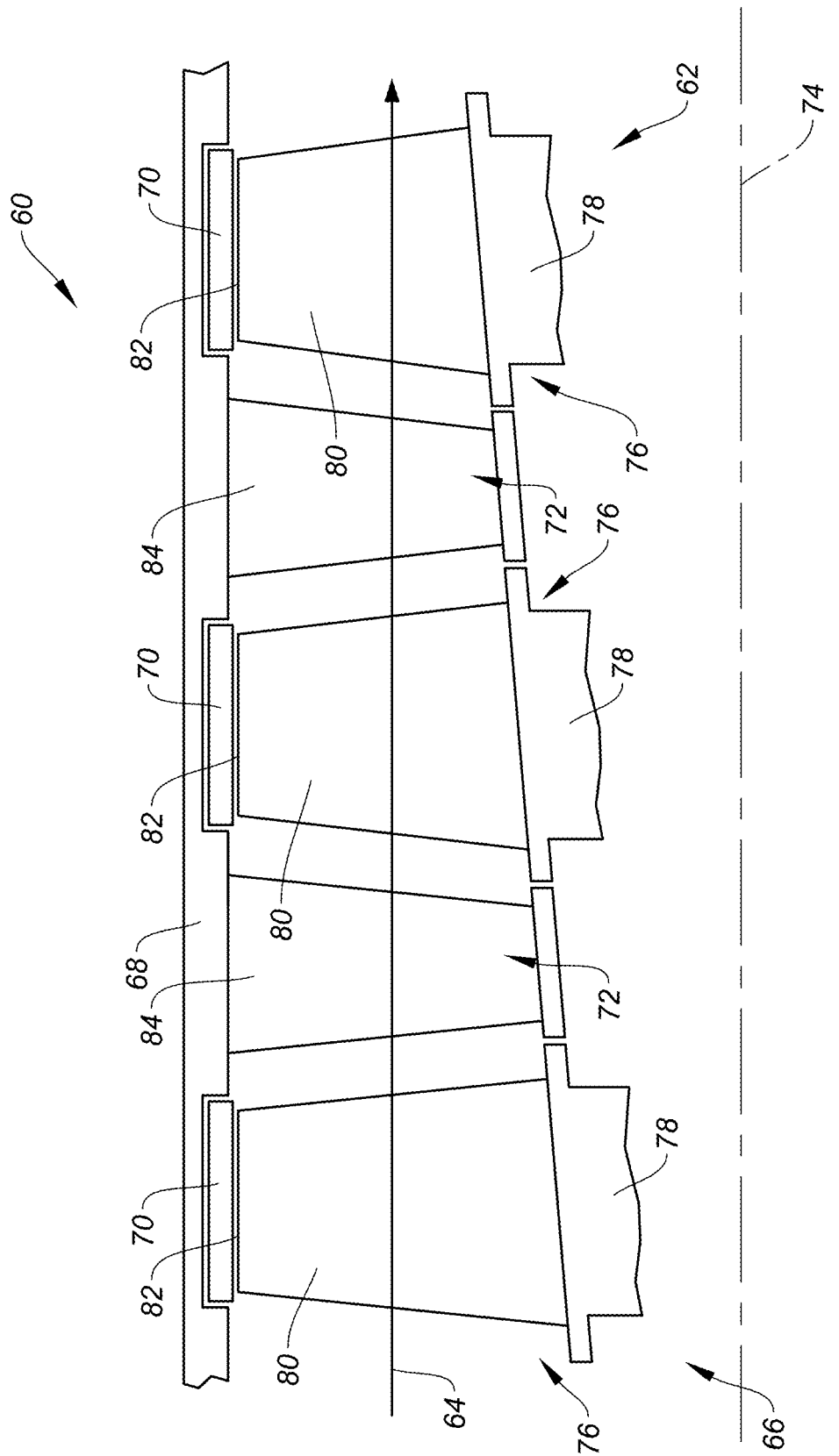
FIG. 3 schematically illustrates a cutaway, side view of a portion of a compressor section of a gas turbine engine, in accordance with one or more embodiments of the present disclosure.

FIG. 3 schematically illustrates a cutaway, side view of a portion of a compressor section 60 for a gas turbine engine, such as the gas turbine engine 22 (see FIG. 2). The portion of the compressor section 60 illustrated in FIG. 3 includes portions of a compressor 62 such as, but not limited to, the low-pressure compressor 26A or the high-pressure compressor 26B (see FIG. 2). The compressor section 60 and its compressor 62 form a portion of a core flow path 64 of the gas turbine engine (e.g., the core flow path 56; see FIG. 2). The compressor 62 includes a bladed compressor rotor 66, a compressor case 68, and at least one outer air seal (OAS) assembly 70 along the core flow path 64. The compressor 62 may additionally include one or more stator vane stages 72 along the core flow path 64.

The bladed compressor rotor 66 is mounted for rotation about a rotational axis 74 of the gas turbine engine. The bladed compressor rotor 66 includes a plurality of rotor stages 76 (e.g., axially-spaced rotor stages). Each of the rotor stages 76 includes a rotor disk 78 and a plurality of rotor blades 80 (e.g., airfoils) disposed on and circumferentially distributed about the rotor disk 78. Each of the rotor blades 80 extends radially outward from the rotor disk 78 to a blade tip 82 at outer radial end of each respective one of the rotor blades 80.

The compressor case 68 extends circumferentially about (e.g., completely around) the rotational axis 74. The compressor case 68 is configured as a generally cylindrical, full-hoop case of an engine static structure (e.g., the engine static structure 32) of the gas turbine engine. The full-hoop compressor case 68 may be formed by a single case body. Alternatively, the compressor case 68 may be formed by two or more case segments (e.g., circumferential segments) assembled together to form the full-hoop compressor case 68 (e.g., a split case configuration). The compressor case 68 circumscribes the bladed compressor rotor 66 and forms an outer radial boundary of the core flow path 64 through the compressor section 60.

The compressor 62 includes the OAS assembly 70 for one, more than one, or each of the rotor stages 76. The OAS assembly 70 is mounted on or otherwise disposed at (e.g., on, adjacent, or proximate) the compressor case 68 axially coincident with and circumscribing a respective one of the rotor stages 76. The OAS assembly 70 forms and controls a blade tip clearance (e.g., a radial gap) between the blade tip 82 of the rotor blades 80 of a respective one of the rotor stages 76 and the OAS assembly 70, as will be discussed in further detail below. The OAS assembly 70, positioned in close proximity to the blade tip 82 of the passing rotor blades 80, facilitates sealing between the rotor blades 80 and the compressor case 68, thereby improving compressor 62 efficiency by reducing air flow leakage around the blade tip 82.

The compressor 62 may include one of the stator vane stages 72 between one, more than one, or each axially adjacent pair of the rotor stages 76. The compressor 62 may additionally include stator vane stages 72 at (e.g., on, adjacent, or proximate) an upstream end and/or a downstream end of the compressor 62. Each of the stator vane stages 72 includes a plurality of stator vanes 84 disposed within the core flow path 64 and circumferentially distributed about the rotational axis 74. The stator vanes 84 are configured to guide core air flow along the core flow path 64 and to direct the core air flow, for example, onto the rotor blades 80 of an immediately downstream one of the rotor stages 76.

FIGS. 4 and 5 schematically illustrate the compressor case 68 and the OAS assembly 70 in greater detail. FIG. 4 illustrates a cutaway, side view of the compressor case 68 and the OAS assembly 70 with the OAS assembly 70 in a first radial position (e.g., an inboard radial position). FIG. 5 illustrates another cutaway, side view of the compressor case 68 and the OAS assembly 70 with the OAS assembly 70 in a second, different radial position (e.g., an outboard radial position). The OAS assembly 70 of FIGS. 4 and 5 includes a plurality of OAS segments 86 and an air seal 88.

The compressor case 68 forms an OAS cavity 90 on an inner radial side 92 (e.g., surface) of the compressor case 68. The OAS cavity 90 extends circumferentially about (e.g., completely around) the rotational axis 74 through the compressor case 68 along the inner radial side 92. The OAS cavity 90 extends (e.g., radially extends) between and to an inner radial end 94 of the OAS cavity 90 and an outer radial end 96 of the OAS cavity 90. The compressor case 68 forms an opening 98 of the OAS cavity 90 at the inner radial side 92 and the inner radial end 94. The outer radial end 96 is formed by an end wall 100 of the compressor case 68. The OAS cavity 90 extends (e.g., axially extends) between and to a leading axial end 102 of the OAS cavity 90 and a trailing axial end 104 of the OAS cavity 90. The leading axial end 102 is formed by a leading side wall 106 of the compressor case 68. The trailing axial end 104 is formed by a trailing side wall 108 of the compressor case 68. The compressor case 68 includes a leading end hook 110 and a trailing end hook 112. The leading end hook 110 and the trailing end hook 112 extend circumferentially about (e.g., completely around) the rotational axis 74. The leading end hook 110 extends axially from the leading side wall 106 on and along the inner radial side 92 toward the trailing end hook 112. Similarly, the trailing end hook 112 extends axially from the trailing side wall 108 on and along the inner radial side 92 toward the leading end hook 110. The leading end hook 110 and the trailing end hook 112 form the opening 98 axially therebetween. The compressor case 68 forms a leading end slot 114 of the OAS cavity 90 at the leading axial end 102. The leading end slot 114 extends circumferentially about (e.g., completely around) the rotational axis 74. The leading end slot 114 is formed radially between the leading end hook 110 and the end wall 100. The leading end slot 114 has a radial span 116 extending radially between and to the leading end hook 110 and the end wall 100.

Figure 6:
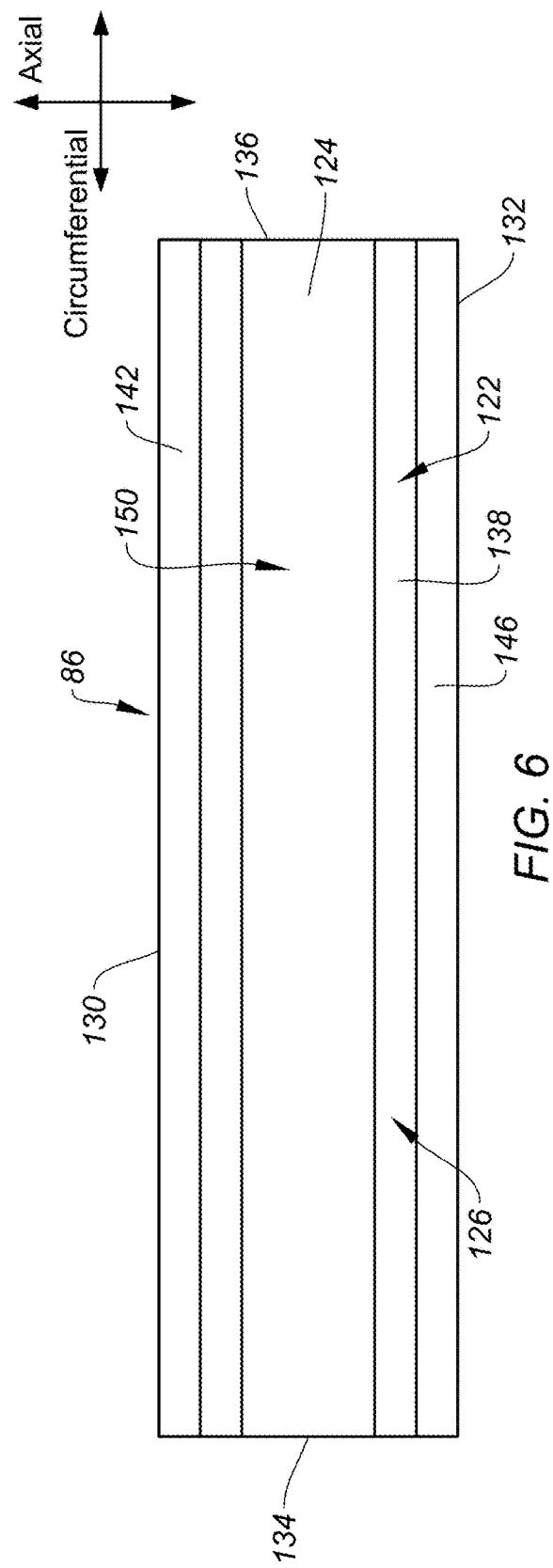
FIG. 6 schematically illustrates an OAS segment of the OAS assembly, in accordance with one or more embodiments of the present disclosure.

FIG. 6 schematically illustrates an inner radial side of one of the OAS segments 86. Each of the OAS segments 86 is a circumferential segment extending partially circumferentially about the rotational axis 74. Each of the OAS segments 86 includes a seal body 122. Each of the OAS segments 86 may additionally include an abradable seal 124.

The seal body 122 extends (e.g., radially extends) between and to an inner radial end 126 of the seal body 122 and an outer radial end 128 of the seal body 122. The seal body 122 extends (e.g., axially extends) between and to a leading axial end 130 of the seal body 122 and a trailing axial end 132 of the seal body 122. The seal body 122 extends (e.g., circumferentially extends) between and to a first circumferential end 134 of the seal body 122 and a second circumferential end 136 of the seal body 122. The seal body 122 forms an inner radial face 138 at the inner radial end 126. The seal body 122 forms an outer radial face 140 opposite the inner radial face 138. The seal body 122 forms a leading end hook 142 at the leading axial end 130. The leading end hook 142 extends circumferentially along the leading axial end 130 from the first circumferential end 134 to the second circumferential end 136. The leading end hook 142 may be formed by an axially-extending or a substantially axially extending segment of the seal body 122. The leading end hook 142 may be disposed radially at the outer radial end 128 and radially spaced from the inner radial end 126 as shown, for example, in FIGS. 4 and 5. For example, the leading end hook 142 may be disposed radially outward of the outer radial face 140. The leading end hook 142 has a radial thickness 144. The seal body 122 forms a trailing end hook 146 at the trailing axial end 132. The trailing end hook 146 extends circumferentially along the trailing axial end 132 from the first circumferential end 134 to the second circumferential end 136. The trailing end hook 146 may be formed by an axially-extending or a substantially axially extending segment of the seal body 122. The trailing end hook 146 may be disposed radially at the outer radial end 128 and radially spaced from the inner radial end 126 as shown, for example, in FIGS. 4 and 5. For example, the trailing end hook 146 may be disposed radially outward of the outer radial face 140. The trailing end hook 146 has a radial thickness 148.

The abradable seal 124 may be disposed on the seal body 122 at the inner radial end 126. For example, the abradable seal 124 may be disposed within a groove 150 formed by the seal body 122 at the inner radial face 138. The abradable seal 124 may extend between and to the first circumferential end 134 and the second circumferential end 136. The abradable seal 124 may project radially from (e.g., radially inward from) the inner radial face 138 such that the abradable seal 124 is positioned in close proximity to the blade tip 82 of the rotor blades 80.

Figure 7:
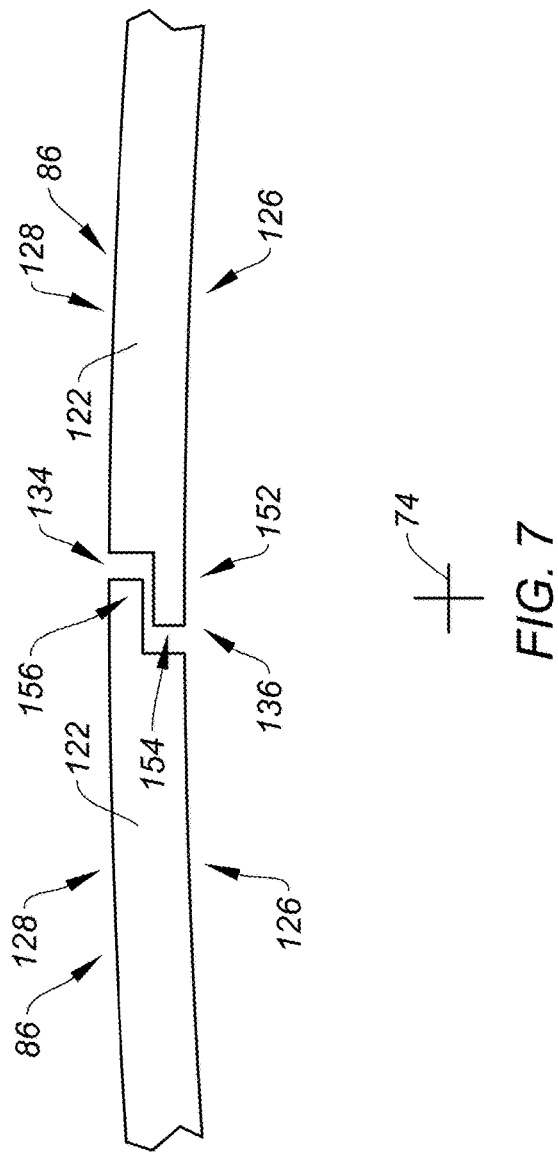
FIG. 7 schematically illustrates an interface of a pair of circumferentially adjacent OAS segments of the OAS assembly, in accordance with one or more embodiments of the present disclosure.

The OAS segments 86 are circumferentially arranged about the rotational axis 74 to form the OAS assembly 70 extending circumferentially about the rotational axis 74. As shown in FIG. 7, for example, at a segment interface 152 between each circumferential adjacent pair of the OAS segments 86, the first circumferential end 134 of each of the OAS segments 86 may be positioned circumferentially adjacent the second circumferential end 136 of another of the OAS segments 86. The OAS segments 86 may be arranged such that the OAS segments 86 form a (small) circumferential gap 154 between the first circumferential end 134 and the second circumferential end 136 at the segment interface 152 during at least some operating conditions of the compressor 62. The OAS segments 86 (e.g., the seal body 122) may form a shiplap joint 156 at the segment interface 152, as shown for example, in FIG. 7; however, the present disclosure is not limited to any particular overlapping joint configuration or other interface configuration at the segment interface 152.

The OAS segments 86, arranged together as described above, are disposed within the OAS cavity 90 formed by the compressor case 68. The leading end hook 142 is disposed within the leading end slot 114. In particular, the leading end hook 142 is disposed radially between the leading end hook 110 and the end wall 100 and the leading axial end 130 is disposed at the leading axial end 102. The trailing end hook 146 is disposed within the trailing end slot 118. In particular, the trailing end hook 146 is disposed radially between the trailing end hook 112 and the end wall 100 and the trailing axial end 132 is disposed at the trailing axial end 104. The inner radial face 138 is disposed facing radially inward toward the rotor blades 80. The outer radial face 140 is disposed facing the end wall 100. The radial spans 116, 120 of the slots 114, 118 are greater than the radial thicknesses 144, 148 of the hooks 142, 146, respectively. Accordingly, the OAS segments 86 are radially moveable within the OAS cavity 90. The OAS segments 86 are radially moveable between and to an inboard radial position (FIG. 4), an outboard radial position (FIG. 5), and any intermediate radial position therebetween. In the inboard radial position of the OAS segments 86, the hooks 142, 146 are disposed at (e.g., contacting) the hooks 110, 112 and radially spaced from the end wall 100. In the outboard radial position of the OAS segments 86, the hooks 142, 146 are disposed at (e.g., contacting) the end wall 100 and radially spaced from the hooks 110, 112. The radial spans 116, 120 of the slots 114, 118 may be greater than the radial thicknesses 144, 148 of the hooks 142, 146 by at least 0.1 percent of a radius 158 (e.g., measured from the rotational axis 74) of the seal body 122 (e.g., the hooks 142, 146) to facilitate suitable radial movement of the OAS segments 86 relative to changes in the radial positions of the blade tips 82.

The air seal 88 is disposed within the OAS cavity 90 radially between the OAS segments 86 and the compressor case 68. The air seal 88 of FIGS. 4 and 5 is disposed radially between and contacting the end wall 100 and the outer radial face 140. The air seal 88 extends circumferentially about (e.g., completely around) the rotational axis 74. The air seal 88 may be formed, for example, as a single-piece, full hoop seal or alternatively as a plurality of circumferential segments arranged together. The air seal 88 is configured to bias the OAS segments 86 radially away from the end wall 100 into the inboard radial position. The air seal 88 of FIGS. 4 and 5 is a compliant seal and, in particular, a finger seal. The present disclosure, however, is not limited to the foregoing exemplary configuration of the air seal 88.

During gas turbine engine (e.g., gas turbine engine 22) operation, the blade tip 82 clearance between the rotor blades 80 and the OAS segments 86 (e.g., the abradable seal 124) may be influenced by a number of factors including, but not limited to, thermal and centrifugal expansion and contraction of the rotor blades 80 and thermal expansion and contraction of the compressor case 68. Additionally, the OAS assembly 70 may facilitate passive control of the blade tip 82 clearances in response to differing localized operating temperatures. To promote optimal efficiency of the compressor 62, it is typically desirable to minimize the blade tip 82 clearances while also limiting physical contact between the rotor blades 80 and the OAS segments 86 (e.g., the abradable seal 124). However, radial positions of the blade tips 82 relative to the compressor case 68 may vary significantly over a range of different gas turbine engine operating conditions, for example, during rapid acceleration or deceleration transients (e.g., of the propulsion system 20 and its gas turbine engine 22; see FIGS. 1 and 2).

The OAS segments 86 may tend to experience greater thermal growth relative to the compressor case 68, for example, as a result of the lower relative mass of the OAS segments 86 and their greater gas path surface area to volume ratio compared to the much larger compressor case 68. At relatively lower operating temperatures of the OAS assembly 70, the circumferential gap 154 may be present between the circumferentially adjacent pairs of the OAS segments 86. In this condition, the air seal 88 may bias the OAS segments 86 into the inboard radial position. As the operating temperature of the OAS assembly 70 increases (e.g., during a power transient), thermal expansion of the OAS segments 86 may cause a size of the circumferential gap 154 to shrink until the circumferential ends 134, 136 of circumferentially adjacent OAS segments 86 contact one another (e.g., circumferentially abut one another) in a condition of the OAS assembly 70 which may be referred to as "segment lock up." In this segment lock up condition of the OAS assembly 70 further thermal expansion of the OAS segments 86 cause radial expansion of the OAS assembly 70 against the biasing force of the air seal 88 such that the OAS segments 86 (e.g., the abradable seal 124 moves radially outward) to or toward the outboard radial position. The position of the end wall 100 along the leading end slot 114 and the trailing end slot 118 limits the range of outward radial motion of the OAS segments 86 (e.g., in the outboard radial position), for example, to prevent excessive outward radial growth of the OAS assembly in the segment lock up condition. In addition to facilitating inward radial biasing of the OAS segments 86, the air seal 88 is configured to prevent or reduce circulation of air around the OAS segments 86, particularly where the seal body 122 is radially separated from the leading end hook 110 and the trailing end hook 112.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. A gas turbine engine comprising:
   a bladed rotor configured for rotation about a rotational axis, the bladed rotor including a rotor stage, the rotor stage including a plurality of rotor blades circumferentially arranged about the rotational axis, each of the plurality of rotor blades extending radially outward to a blade tip;
   a case extending circumferentially about the rotational axis and circumscribing the bladed rotor, the case forming an outer air seal (OAS) cavity at the rotor stage, the OAS cavity including a leading axial end slot and a trailing axial end slot; and
   an OAS assembly including a plurality of OAS segments and an air seal,
      the plurality of OAS segments disposed within the OAS cavity, the plurality of OAS segments arranged circumferentially to form the OAS assembly extending circumferentially about the rotational axis, each of the plurality of OAS segments including a seal body extending between and to a first circumferential body end and a second circumferential body end, the seal body including a leading end body hook and a trailing end body hook, the leading end body hook disposed in the leading axial end slot, the trailing end body hook disposed in the trailing axial end slot, each of the OAS segments radially moveable within the OAS cavity between and to an inboard radial position and an outboard radial position, and
      the air seal positioned radially between and contacting the case and the seal body, the air seal biasing each of the plurality of OAS segments towards the inboard radial position;
   wherein the seal body extends radially between and to an inner radial face and an outer radial face, the air seal contacts the seal body on the outer radial face, the outer radial face is disposed axially between the leading end body hook and the trailing end body hook, and the leading end body hook and the trailing end body hook are disposed radially outward of the outer radial face.

2. The gas turbine engine of claim 1, wherein the seal body includes an inner radial face, and each of the plurality of OAS segments further includes an abradable seal disposed at the inner radial face.

3. The gas turbine engine of claim 1, wherein the air seal is a finger seal.

4. The gas turbine engine of claim 1, wherein the leading axial end slot has a radial span, the leading end body hook has a radial thickness, and the radial span is greater than the radial thickness.

5. The gas turbine engine of claim 4, wherein the radial span is greater than the radial thickness by at least 0.1 percent of a radius of the seal body.

6. The gas turbine engine of claim 1, wherein the case includes a cavity end wall, a leading end case hook, and a trailing end case hook, the case forms the leading axial end slot radially between the leading end case hook and the cavity end wall, and the case forms the trailing axial end slot radially between the trailing end case hook and the cavity end wall.

7. The gas turbine engine of claim 1, wherein the first circumferential body end of the seal body of a first OAS segment of the plurality of OAS segments is disposed circumferentially adjacent the second circumferential body end of the seal body of a second OAS segment of the plurality of OAS segments at a segment interface, the first OAS segment and the second OAS segment in the inboard radial position form a circumferential gap at the segment interface, and the first OAS segment and the second OAS segment in the outboard radial position circumferentially abut one another at the segment interface.

8. The gas turbine engine of claim 7, wherein the first OAS segment and the second OAS segment form a shiplap joint at the segment interface.

9. The gas turbine engine of claim 1, wherein the leading end body hook and the trailing end body hook radially abut the case in the inboard radial position and the outboard radial position.

10. A gas turbine engine comprising:
    a bladed rotor configured for rotation about a rotational axis, the bladed rotor including a rotor stage, the rotor stage including a plurality of rotor blades circumferentially arranged about the rotational axis, each of the plurality of rotor blades extending radially outward to a blade tip;
    a case extending circumferentially about the rotational axis and circumscribing the bladed rotor, the case forming an outer air seal (OAS) cavity at the rotor stage, the case including a cavity end wall, a leading end case hook, and a trailing end case hook, the case forming a leading axial end slot radially between the leading end case hook and the cavity end wall, the case forming a trailing axial end slot radially between the trailing end case hook and the cavity end wall; and
    an OAS assembly including a plurality of OAS segments and an air seal,
       the plurality of OAS segments disposed within the OAS cavity, the plurality of OAS segments arranged circumferentially to form the OAS assembly extending circumferentially about the rotational axis, each of the plurality of OAS segments including a seal body extending between and to a first circumferential body end and a second circumferential body end, the seal body extending between and to a leading axial body end and a trailing axial body end, the seal body including a leading end body hook at the leading axial body end, the seal body including a trailing end body hook at the trailing axial body end, the leading end body hook disposed in the leading axial end slot, the trailing end body hook disposed in the trailing axial end slot, the air seal positioned radially between and contacting the cavity end wall and the seal body, the air seal biasing the leading end body hook toward the leading end case hook and biasing the trailing end body hook toward the trailing end case hook;

wherein the leading end body hook and the trailing end body hook radially abut the case in the inboard radial position and the outboard radial position.

11. The gas turbine engine of claim 10, wherein the seal body includes an inner radial face, and each of the plurality of OAS segments further includes an abradable seal disposed at the inner radial face.

12. The gas turbine engine of claim 10, wherein the air seal is a finger seal.

13. The gas turbine engine of claim 10, wherein the leading axial end slot has a radial span, the leading end body hook has a radial thickness, and the radial span is greater than the radial thickness.

14. A gas turbine engine comprising:
 a bladed rotor configured for rotation about a rotational axis, the bladed rotor including a rotor stage, the rotor stage including a plurality of rotor blades circumferentially arranged about the rotational axis, each of the plurality of rotor blades extending radially outward to a blade tip;
 a case extending circumferentially about the rotational axis and circumscribing the bladed rotor, the case forming an outer air seal (OAS) cavity at the rotor stage, the OAS cavity including a leading axial end slot and a trailing axial end slot, each of the leading axial end slot and the trailing axial end slot having a radial span; and
 an OAS assembly including a plurality of OAS segments and an air seal,
  the plurality of OAS segments disposed within the OAS cavity, the plurality of OAS segments arranged circumferentially to form the OAS assembly extending circumferentially about the rotational axis, each of the plurality of OAS segments including a seal body extending between and to a first circumferential body end and a second circumferential body end, the seal body extending between and to a leading axial body end and a trailing axial body end, the leading axial body end disposed in the leading axial end slot, the trailing axial body end disposed in the trailing axial end slot, each of the leading axial body end and the trailing axial body end having a radial thickness, the radial span greater than the radial thickness by at least 0.1 percent of a radius of the seal body, each of the OAS segments radially moveable within the OAS cavity between and to an inboard radial position and an outboard radial position, and
  the air seal positioned radially between and contacting the case and the seal body, the air seal biasing each of the plurality of OAS segments towards the inboard radial position;
 wherein the first circumferential body end of the seal body of a first OAS segment of the plurality of OAS segments is disposed circumferentially adjacent the second circumferential body end of the seal body of a second OAS segment of the plurality of OAS segments at a segment interface, the first OAS segment and the second OAS segment in the inboard radial position form a circumferential gap at the segment interface, and the first OAS segment and the second OAS segment in the outboard radial position circumferentially abut one another at the segment interface.

15. The gas turbine engine of claim 14, wherein the seal body includes an inner radial face, and each of the plurality of OAS segments further includes an abradable seal disposed at the inner radial face.

16. The gas turbine engine of claim 14, wherein the air seal is a finger seal.

17. The gas turbine engine of claim 14, wherein the seal body extends radially between and to an inner radial face and an outer radial face, the air seal contacts the seal body on the outer radial face, and the outer radial face is radially inward of the seal body at the leading axial body end and the trailing axial body end.

* * * * *